(12) United States Patent
Metz

(10) Patent No.: US 10,663,010 B2
(45) Date of Patent: May 26, 2020

(54) TORQUE TRANSMITTING ASSEMBLY WITH DAMPER ASSEMBLY INCLUDING TWO SETS OF OUTER SPRINGS IN SERIES

(71) Applicant: Schaeffler Technologies AG & Co. KG, Herzogenaurach (DE)

(72) Inventor: Sean Metz, Smithville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 311 days.

(21) Appl. No.: 15/280,202

(22) Filed: Sep. 29, 2016

(65) Prior Publication Data

US 2018/0087581 A1 Mar. 29, 2018

(51) Int. Cl.
*F16D 13/52* (2006.01)
*F16F 15/123* (2006.01)
(Continued)

(52) U.S. Cl.
CPC ........... *F16D 13/52* (2013.01); *F16D 13/648* (2013.01); *F16D 13/72* (2013.01); *F16D 13/74* (2013.01); *F16D 25/0638* (2013.01); *F16F 15/1232* (2013.01); *F16F 15/12366* (2013.01); *F16F 15/12373* (2013.01); *F16H 45/02* (2013.01); *F16D 2300/0214* (2013.01); *F16D 2300/22* (2013.01); *F16H 2045/0231* (2013.01); *F16H 2045/0284* (2013.01)

(58) Field of Classification Search
CPC .. F16F 15/123; F16F 15/1232; F16F 15/1216; F16D 13/52; F16D 13/648; F16D 25/0638; F16D 2300/22; F16D 45/02; F16H 2045/0231; F16H 2045/0284
See application file for complete search history.

(56) References Cited

U.S. PATENT DOCUMENTS 6,244,401 B1 * 6/2001 Maienschein ........... F16H 45/02
192/213.1
9,732,835 B2 * 8/2017 Kawahara ........... F16F 15/1421
(Continued)

FOREIGN PATENT DOCUMENTS

JP 2009041662 A * 2/2009
JP 2011214607 A * 10/2011 ............. F16H 45/02

*Primary Examiner* — Stacey A Fluhart
(74) *Attorney, Agent, or Firm* — Davidson, Davidson & Kappel, LLC

(57) ABSTRACT

A torque transmitting assembly is provided. The torque mission assembly includes a first cover plate and a second cover plate supporting a radially inner set of springs therebetween; and a first radially outer set of springs and a second radially outer set of springs in series with the first radially outer set of springs. The first radially outer set of springs are arranged for transferring torque from the second radially outer set of springs to the radially inner set of springs via the second cover plate. A method of constructing a torque transmission assembly is also provided. The method includes providing a first cover plate and a second cover plate supporting a radially inner set of springs therebetween; providing a first radially outer set of springs and a second radially outer set of springs in series with the first radially outer set of springs; and arranging the first radially outer set of springs for transferring torque from the second radially outer set of springs to the radially inner set of springs via the second cover plate.

20 Claims, 4 Drawing Sheets

(51) Int. Cl.
*F16D 13/64* (2006.01)
*F16D 13/72* (2006.01)
*F16D 13/74* (2006.01)
*F16D 25/0638* (2006.01)
*F16H 45/02* (2006.01)

(56) References Cited

U.S. PATENT DOCUMENTS

| | | | | |
|---|---|---|---|---|
| 2001/0052443 | A1* | 12/2001 | Tomiyama | F16H 45/02 192/3.29 |
| 2011/0240432 | A1* | 10/2011 | Takikawa | F16H 45/02 192/3.29 |
| 2012/0111683 | A1* | 5/2012 | Ito | F16F 15/145 192/3.28 |
| 2012/0208648 | A1* | 8/2012 | Takikawa | F16H 45/02 464/68.8 |
| 2012/0273317 | A1* | 11/2012 | Kram | F16H 45/02 192/3.28 |
| 2014/0251746 | A1* | 9/2014 | Ito | F16F 15/134 192/70.11 |
| 2015/0362053 | A1* | 12/2015 | Kawahara | F16H 45/02 60/330 |
| 2016/0238117 | A1* | 8/2016 | Horen | F16H 45/02 |
| 2017/0198795 | A1* | 7/2017 | Tsuji | F16H 45/02 |
| 2017/0254387 | A1* | 9/2017 | Okaji | F16F 15/12353 |
| 2018/0245663 | A1* | 8/2018 | Yoshikawa | F16H 45/02 |

* cited by examiner

TORQUE TRANSMITTING ASSEMBLY WITH DAMPER ASSEMBLY INCLUDING TWO SETS OF OUTER SPRINGS IN SERIES

The present disclosure relates generally to motor vehicle torque transmitting assemblies and more specifically to damper assemblies thereof.

BACKGROUND

Damper assemblies for motor vehicle torque transmitting assemblies, such as torque converters or wet clutches, positioned between the engine and transmission conventionally include a single set of outer springs.

SUMMARY OF THE INVENTION

A motor vehicle torque transmitting assembly is provided. The motor vehicle torque transmitting assembly includes a first cover plate and a second cover plate supporting a radially inner set of springs therebetween; and a first radially outer set of springs and a second radially outer set of springs in series with the first radially outer set of springs. The first radially outer set of springs are arranged for transferring torque from the second radially outer set of springs to the radially inner set of springs via the second cover plate.

A method of constructing a motor vehicle torque transmitting assembly is also provided. The method includes providing a first cover plate and a second cover plate supporting a radially inner set of springs therebetween; providing a first radially outer set of springs and a second radially outer set of springs in series with the first radially outer set of springs; and arranging the first radially outer set of springs for transferring torque from the second radially outer set of springs to the radially inner set of springs via the second cover plate.

A torque transmission assembly is also provided that includes a drive assembly configured for drivingly connecting to a transmission input shaft, a first radially outer set of springs and a second radially outer set of springs in series with the first radially outer set of springs. The first radially outer set of springs is arranged for transferring torque from the second radially outer set of springs to the drive assembly. The torque transmission assembly also includes a clutch assembly including a clutch pack radially inside of the first radially outer set of springs and the second radially outer set of springs.

BRIEF DESCRIPTION OF THE DRAWINGS

The present invention is described below by reference to the following drawings, in which.

DETAILED DESCRIPTION

The disclosure provides damper assemblies configured for achieving a low spring rate during torque transfer by including two sets of arc springs operating in series. Embodiments of the damper assemblies may be used in a torque converter or a wet launch clutch.

Figure 1:
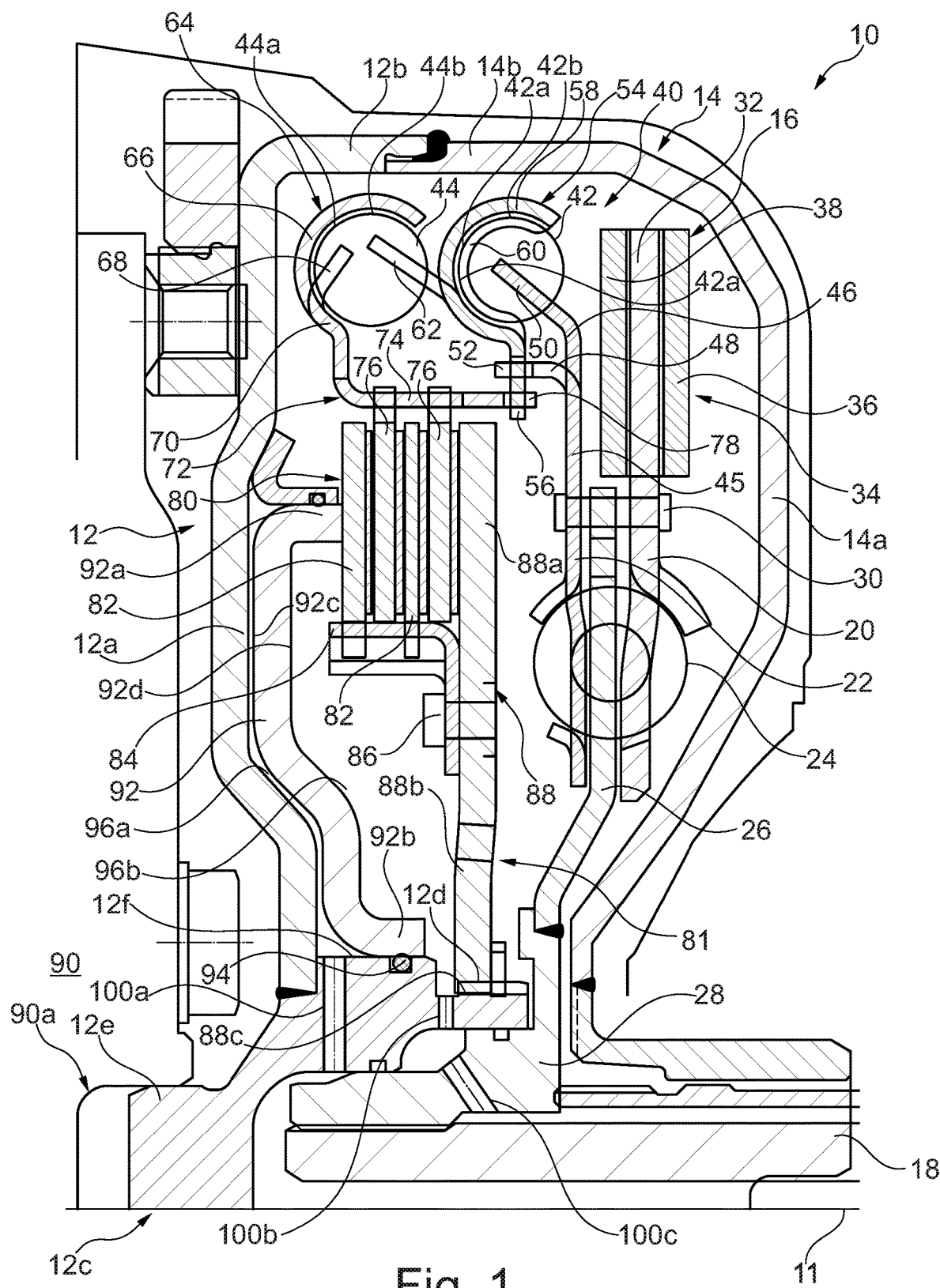
FIG. 1 shows a cross-sectional side view of a motor vehicle wet launch clutch according to a first embodiment of the present invention.

FIG. 1 shows a cross-sectional side view of a wet clutch 10 in accordance with a first embodiment of the present invention. Wet clutch 10 is rotatable about a center axis 11 and includes a front cover 12 for connecting to a crankshaft of an internal combustion engine and a rear cover 14. The terms axially, radially and circumferentially as used herein are used with respect to center axis 11.

Front cover 12 is substantially cup-shaped and includes a radially extending section 12a that intersects and extends radially away from center axis 11 and an annular axially extending section 12b that protrudes axially at an outer circumference of section 12a. Rear cover 14 is similarly cup-shaped and includes a radially extending section 14a and an annular axially extending section 14b that protrudes axially at an outer circumference of radially extending section 14a.

A drive assembly in the form of a damper assembly 16 is positioned inside of rear cover 14 and is configured for transferring torque to a transmission input shaft 18. Damper assembly 16 includes two cover plates—a rear side cover plate 20 and a front side cover plate 22. Radially inner portions of cover plates 20, 22, which are radially inside of a plurality of circumferentially spaced rivets 30 fixing cover plates 20, 22 together, support a radially inner set of arc springs 24 axially therebetween. Damper assembly 16 also includes a drive flange 26 positioned axially between cover plates 20, 22. Drive flange 26 includes an inner radial hub 28 configured for nonrotatably connecting to a transmission input shaft 18. Drive flange 26 includes circumferentially extending slots for receiving springs 24. Radially outside of springs 24, cover plates 20, 22 are fixed together by rivets 30. A radially outer portion of cover plate 20, which is radially outside of rivets 30, forms a flange 32 of a centrifugal pendulum absorber (CPA) 34, which further includes two sets of masses 36, 38—a first set of masses 36 at a rear cover side of flange 32 and a second set of masses 38 at a front cover side of flange 32—slidably supported by flange 32.

A radially outer portion of cover plate 22, which is radially outside of rivets 30, forms part of a radially outer spring assembly 40, which also includes two sets of radially outer springs 42, 44—a first set of springs 42 closer to rear cover 14 and a second set of spring 44 closer to front cover—that are connected in series and are axially offset from each outer, but radially aligned with each other. In this embodiment, the radially outer portion of cover plate 22 includes an annular base 45 that splits into two separate sections 46, 48 that are radially offset from each other. A first section 46, i.e., a radially outer section, includes a plurality of circumferentially spaced tabs 50 that are configured for contacting ends of springs 42. Tabs 50 extend directly radially outward from base 45, then bend axially toward front cover section 12a while extending further radially outward. A second section 48, i.e., a radially inner section, includes a plurality of axially extending tabs 52 extending axially away from base 45 toward front cover section 12a.

Radially outer spring assembly 40 includes a first spring retainer 54 includes radially extending inner tabs 56 for extending between axially extending tabs 52 and a rounded spring retaining section 58 contoured with an arc-shaped cross-section to wrap around a portion of an outer surface 42a of springs 42 and follow an arc-shape of the portion of outer surface 42a of springs 42 past a radially outermost edge 42b of outer surface 42a. Tabs 52 are arranged as overload stops for springs 42 by contacting tabs 56 to limit the compression of springs 42. More specifically, tabs 52 are overload stops because a circumferential edge of each of tabs 52 is circumferentially spaced a distance less than a circumferential length of one of springs 42 from a circumferential edge of a corresponding one of tabs 56 when springs are not compressed such that when springs 42 are compressed during operation due to cover plate 22 being rotated with respect to spring retainer 54, the circumferential edge of each of tabs 52 contacts the circumferential edge of the corresponding tab 56 to limit springs 42 from being further compressed past a designed limit. Rounded spring retaining section 58 is provided with abutments 60 configured for contacting ends of springs 42. First spring retainer 54 also includes a plurality of circumferentially spaced tabs 62 protruding from rounded spring retaining section 58 that are configured for contacting ends of springs 44. In this embodiment, driven tabs 62 are formed integrally with spring retainer 54. More specifically, tabs 62 were lanced from rounded spring retaining section 58. Tabs 62 protrude axially toward front cover section 12a and radially outward from rounded spring retaining section 58 into spaces circumferentially between springs 44.

Radially outer spring assembly 40 also includes a second spring retainer 64 retaining second springs 44. Second spring retainer 64 is formed as a piece separate from first spring retainer 54. Second spring retainer 64 includes a rounded spring retaining section 66 contoured with an arc-shaped cross-section to wrap around a portion of an outer surface 44a of springs 44 and follow an arc-shape of the portion of outer surface 44a of springs 44 past a radially outermost edge 44b of outer surface 44a. Rounded spring retaining section 66 is provided with abutments 68 configured for contacting ends of springs 44. Second spring retainer 64 also includes an inner radial extension 70 extending radially inward from rounded spring retaining section 66 and an axially extending ring 72 protruding axially from inner radial extension 70 toward rear cover 14. Axially extending ring 72 includes a radially outer clutch plate carrier 74 for carrying radially outer ends of clutch plates 76 and an axial end thereof, axially extending ring 72 also includes a plurality of axially extending tabs 78 for extending through spaces between radially extending tabs 56 such that tabs 56 form overload stops for springs 44 by contacting tabs 78 to limit the compression of spring 44. Accordingly, radially outer clutch plate carrier 74 is formed integrally with spring retainer 64. More specifically, tabs 56 are overload stops because a circumferential edge of each of tabs 56 is circumferentially spaced a distance less than a circumferential length of one of springs 44 from a circumferential edge of a corresponding one of tabs 78 when springs 44 are not compressed such that when springs 44 are compressed during operation due to spring retainer 54 being rotated with respect to spring retainer 64, the circumferential edge of each of tabs 56 contacts the circumferential edge of the corresponding tab 78 to limit springs 44 from being further compressed past a designed limit.

Clutch plates 76 form a clutch pack 80 of a clutch assembly 81 together with clutch plates 82. Clutch assembly 81 also includes a radially inner clutch plate carrier 84 carrying radially inner ends of clutch plates 82, with clutch plates 76 alternating with clutch plates 82 in clutch pack 80. Clutch assembly 81 also includes a clutch backing plate 88, with radially inner clutch plate carrier 84 being fixed to clutch backing plate 88 by a plurality of rivets 86. Clutch pack 80 is aligned at radially outer portion 88a of clutch backing plate 88, while a radially inner portion 88b of clutch backing plate 88 is fixed for rotation with a hub section 12c of front cover 12. More specifically, an inner circumferential surface 88c of clutch backing plate 88 is splined for non-rotatably connecting to a splined outer circumferential surface 12d of hub section 12c. Hub section 12c is fixed to an inner radially end of radially extending section 12a and includes a pilot 12e for insertion into a blind hole 90a of crankshaft 90 to align front cover 12 with crankshaft 90. Hub section 12c is rotatable with respect to hub 28, which is positioned radially inside of hub section, and is sealed with respect to hub 28 at an inner surface of hub section 12c by a first seal 28a and a second seal 28c.

Wet clutch 10 also includes a piston 92 that is axially slidable for engaging clutch pack 80. Piston 92 includes a radially outer end 92a for contacting clutch pack 80, at rearmost clutch plate 82, and a radially inner end 92b for sliding axially along a seal 94 provided on an outer circumferential surface 12f of hub section 12c. Piston 92 engages clutch pack 80 by forcing clutch plates 76, 82 axially toward radially outer portion 88a of clutch backing plate 88 such that clutch plates 76, 82 are sandwiched axially between piston and clutch backing plate 88 and friction surfaces of clutch plates 76, 82 engage the respective adjacent plate 76, 82 and plates 76 transfer torque to damper assembly 16. Piston 92 is rotatable independent of hub section 12c and is axially slidable based on a relative pressure difference between a front side pressure region 96a on a front side of piston 92 and a rear side pressure region 96b on a rear side of piston 92. Front side pressure region 96a is delimited by a front facing surface 92c of piston 92, radially extending section 12a of front cover 12 and a radially outer sealing ring 98. Rear side pressure region 96b is delimited by a rear facing surface 92d of piston 92 and by clutch assembly 81. Fluid is provided to front side pressure region 96a via a channel 100a in hub section 12c and fluid is provided to rear side pressure region 96b via a channel 100b in hub section 12c, which is fed with fluid via a channel 100c in hub 28.

When piston 92 engages clutch pack 80, torque from crankshaft 90 is transmitted from front cover 12 to damper assembly 16 via clutch assembly 81, then damper assembly 16 in turn transmits torque to transmission input shaft 18 via hub 28. More specifically, when piston 92 forces clutch pack 80 against clutch backing plate 88, hub section 12c transmits torque to clutch backing plate 88 via splined surfaces 12d, 88c and clutch backing plate transmits torque to clutch plates 82 to radially inner clutch plate carrier 84. Clutch plates 82 then transmit torque to clutch plates 76 via friction material and clutch plates 76 in turn transmit torque to springs 44 via spring retainer 64. Springs 44 then transmit torque to spring retainer 58 via engagement with tabs 62, and spring retainer 54 transmits torque to springs 42. Springs 42 in turn transmit torque to cover plates 20, 22 via tabs 50 of cover plate 22, and cover plates 220, 22 transmit torque to springs 24. Springs 24 in turn transmit torque to flange 26, which transmits torque to transmission input shaft 18 via hub 28.

Figure 2:
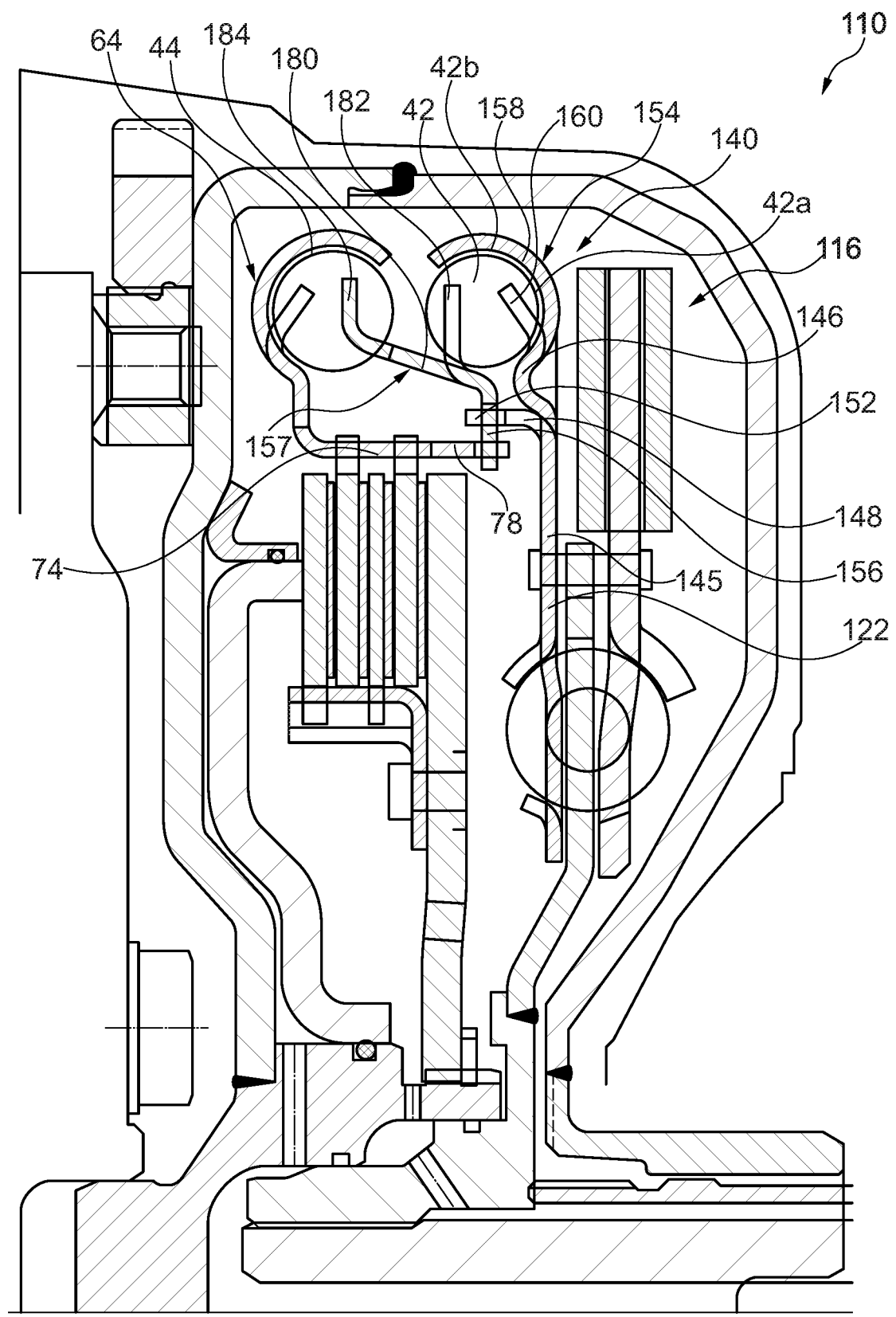
FIG. 2 shows a cross-sectional side view of a motor vehicle wet launch clutch according to a second embodiment of the present invention.

FIG. 2 shows a cross-sectional side view of a wet clutch 110 in accordance with a second embodiment of the present invention. Wet clutch 110 is configured in the same manner as wet clutch 10 in FIG. 1, except that damper assembly 116 of wet clutch 110 is different from damper assembly 16 in that radially outer spring assembly 40 is replaced with a radially outer spring assembly 140. A cover plate 122 is different from cover plate 22 in that the radially outer portion of cover plate 122 forms a first spring retainer 154 for first outer springs 42. At the rationally outer portion thereof, an annular base 45 of cover plate 122 splits into two separate sections 146, 148 that are radially offset from each other. A first section 146, i.e., a radially outer section, includes spring retainer 154. First spring retainer 154 includes a rounded spring retaining section 158 contoured with an arc-shaped cross-section to wrap around a portion of an outer surface 42a of springs 42 and follow an arc-shape of the portion of outer surface 42a of springs 42 past a radially outermost edge 42b of outer surface 42a. Rounded spring retaining section 158 is provided with abutments 160 configured for contacting ends of springs 42. A second section 148, i.e., a radially inner section, includes a plurality of axially extending tabs 152 extending axially away from base 145 toward front cover section 12a. Tabs 152 are configured as overload stops for springs 42 by contacting radially inwardly projecting tabs 156 of a drive section 157 to limit the compression of springs 42.

Radially outer spring assembly 140, in the same manner as radially outer spring assembly, also includes second spring retainer 64 retaining second springs 44 and including radially outer clutch plate carrier 74. Drive section 157 is formed as a piece separate from spring retainers 154, 64 and is provided axially between first spring retainer 154 and second spring retainer 64. Drive section 157 includes a base section 180 and a plurality of circumferentially spaced first spring tabs 182 extending radially outward from base section 180 arranged for contacting ends of springs 42. In this embodiment, tabs 182 were lanced from base section 180. Drive section 157 further includes a plurality of circumferentially spaced second spring tabs 184 protruding from base section 180 that are configured for contacting ends of springs 44. Tabs 184 protrude axially toward front cover section 12a and radially outward from base section 180 into spaces circumferentially between springs 44. Drive section 157 includes radially inwardly projecting tabs 156 arranged as overload stops for springs 44 by contacting tabs 78 of spring retainer 64 to limit the compression of springs 44.

Figure 3:
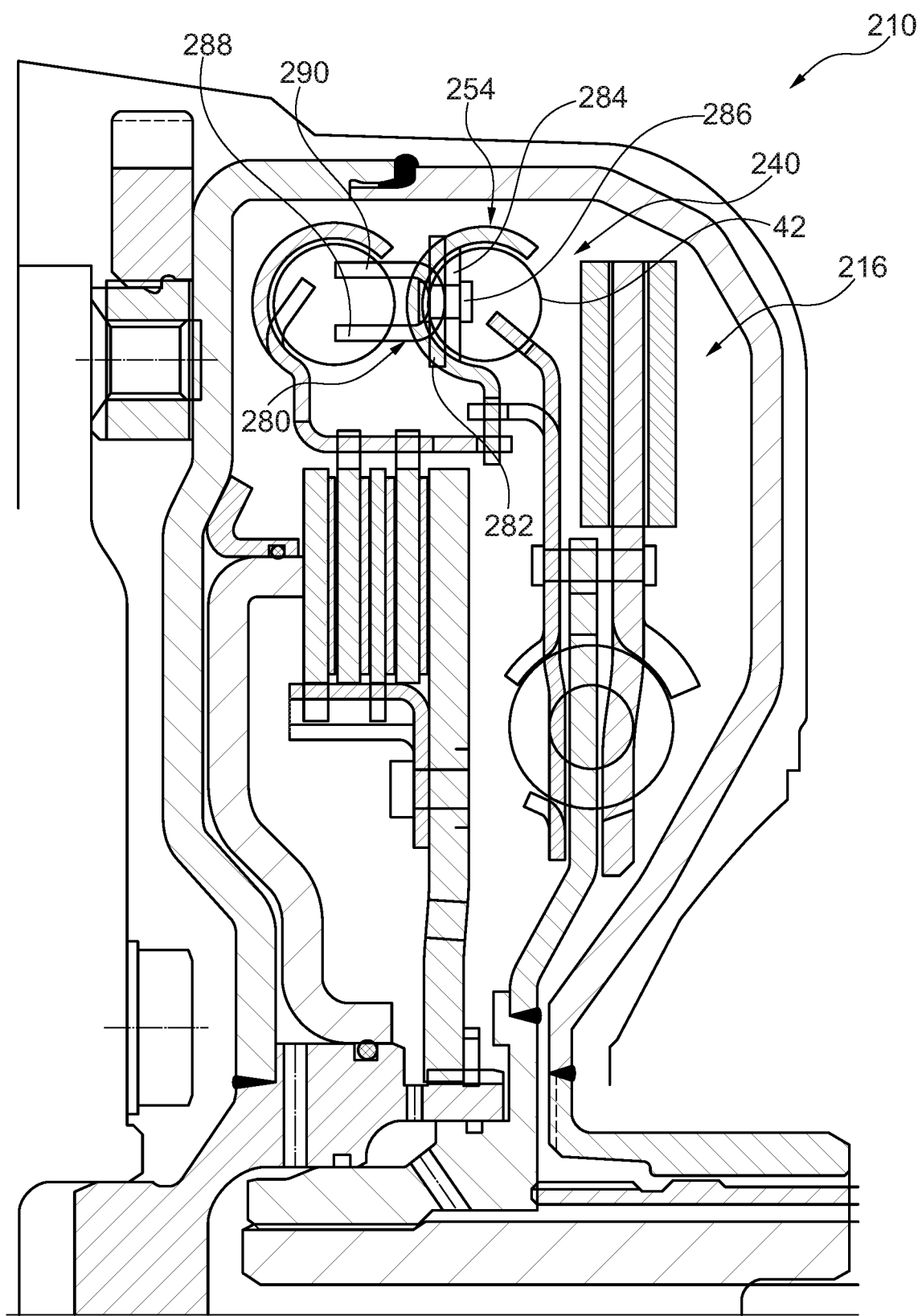
FIG. 3 shows a cross-sectional side view of a motor vehicle wet launch clutch according to a third embodiment of the present invention.

FIG. 3 shows a cross-sectional side view of a wet clutch 210 in accordance with a third embodiment of the present invention. Wet clutch 210 is configured in the same manner as wet clutch 10 in FIG. 1, except that damper assembly 216 of wet clutch 210 is different from damper assembly 16 in that radially outer spring assembly 40 is replaced with a radially outer spring assembly 240. Specifically, instead of including spring retainer 54 with a lanced tab 62, radially outer spring assembly 240 includes additional circumferentially spaced drive segments 280 riveted to a spring retainer 254. In this embodiment, each drive segment 280 has a flat base 282 extending perpendicular to center axis 11 that is riveted to one of a plurality of circumferentially spaced flat shoulders 284 of spring retainer 254. Flat shoulders 284 are abutments that are arranged to contact ends of springs 42 and are each positioned axially between two springs 42. Rivets 286 each pass through base 282 and the respective shoulder 284 to fix drive segments 280 to spring retainer 254. In this embodiment, drive segments 280 each further include two drive tabs—a radially inner drive tab 288 and a radially outer drive tab 290—protruding axially from base 282 toward front cover section 12a into spaces circumferentially between springs 44 to contact ends of springs 44.

Figure 4:
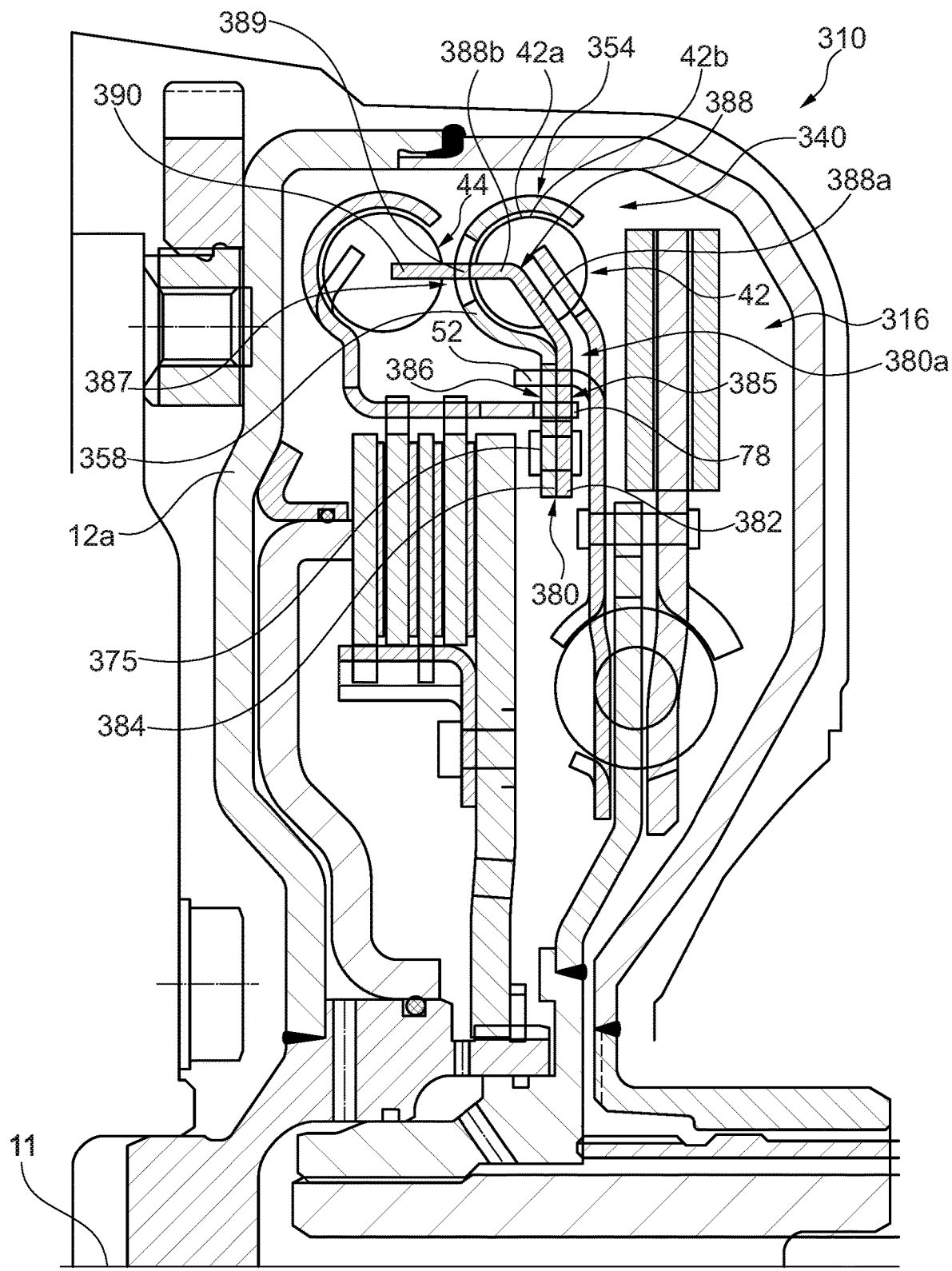
FIG. 4 shows a cross-sectional side view of a motor vehicle wet launch clutch according to a fourth embodiment of the present invention.

FIG. 4 shows a cross-sectional side view of a wet clutch 310 in accordance with a fourth embodiment of the present invention. Wet clutch 310 is configured in the same manner as wet clutch 10 in FIG. 1, except that damper assembly 316 of wet clutch 310 is different from damper assembly 16 in that radially outer spring assembly 40 is replaced with a radially outer spring assembly 340. Specifically, instead of including spring retainer 54 with a lanced tab 62, radially outer spring assembly 340 includes an additional circumferentially spaced drive plate 380 riveted to a spring retainer 254 by a plurality of circumferentially spaced rivets 375. In this embodiment, drive segment 380, starting from a radially inner end thereof, has a flat annular base 382 extending perpendicular to center axis 11 that is riveted to a flat annular base 384 at a radially inner end of spring retainer 354. Radially outside of bases 382, 384, drive segment 380 and spring retainer 354 include respective circumferentially extending slots 385, 386 formed therein. Slots 385, 386 receive axially extending tabs 52, 78 such that bases 382, 384 form overload stops for springs 44 via contact with tabs 78, and tabs 52 form overload stops for springs 42 via contact with bases 382, 384.

Radially outside of slots 386, spring retainer 354 includes a rounded spring retaining section 358 contoured with an arc-shaped cross-section to wrap around a portion of an outer surface 42a of springs 42 and follow an arc-shape of the portion of outer surface 42a of springs 42 past a radially outermost edge 42b of outer surface 42a. In a middle of rounded spring retaining section 358 at portions of spring retainer 354 that are axially closest to springs 44, spring retainer 354 includes slots 387 extending axially through rounded spring retaining section 358.

Radially outside of slots 385, drive plate 380 includes a plurality of circumferentially spaced tabs 380a, with each tabs 380a including a first spring driving portion 388 for driving a respective first spring 42. Portions 388 each include an angled axially and radially extending section 388a extending radially outward from slots 385 and axially toward front cover section 12a and an axially extending section 388b extending axially away from section 388a toward front cover section 12a. Sections 388a each contact a first portion of an end of a respective spring 42, near a radially inner portion of the spring 42, and sections 388b each contact a second portion of an end of a respective spring 42, at portions of the ends of springs 42 that are axially closest to springs 44. Axially past section 388b toward front cover section 12a, each tab 380a includes slot passing portion 389 extending axially away from portion 388b through the respective slot 387 and then a second spring driven portion 390 for being driven by the respective second spring 44. Drive portion 390 extends axially away from portion 388b toward front cover section 12a and contacts portions of the ends of springs 44 that are axially closest to springs 42.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:
1. A torque transmission assembly comprising:
 a first cover plate and a second cover plate supporting a radially inner set of springs therebetween;
 a first radially outer set of springs and a second radially outer set of springs in series with the first radially outer set of springs, the first radially outer set of springs being axially spaced apart from the second radially outer set of springs; and
 at least one clutch plate configured for transferring a torque to the second radially outer set of springs, the first radially outer set of springs arranged for transfer- ring the torque from the second radially outer set of springs to the radially inner set of springs via the second cover plate,
wherein the first radially outer set of springs are radially aligned with the second radially outer set of springs.

2. The torque transmission assembly as recited in claim 1 further comprising a radially outer clutch plate carrier carrying a radially outer end of the at least one clutch plate.

3. The torque transmission assembly as recited in claim 2 further comprising a spring retainer retaining the second radially outer set of springs, the radially outer clutch plate carrier being formed integrally with the spring retainer.

4. The torque transmission assembly as recited in claim 2 further comprising a clutch backing plate and a piston configured for engaging the at least one clutch plate to sandwich the at least one clutch plate axially between the piston and the clutch backing plate.

5. The torque transmission assembly as recited in claim 4 further comprising a front cover including a hub section, an inner circumferential surface of the clutch backing plate being nonrotatably connected to the hub section.

6. The torque transmission assembly as recited in claim 1 further comprising first tabs driven by contact with the second radially outer set of springs configured for transmitting torque from the second radially outer set of springs to the first radially outer set of springs.

7. The torque transmission assembly as recited in claim 6 further comprising a first spring retainer retaining the first radially outer set of springs, the first tabs being connected to the first spring retainer.

8. The torque transmission assembly as recited in claim 7 wherein the first tabs are formed as a single piece with the first spring retainer.

9. The torque transmission assembly as recited in claim 7 further comprising a second spring retainer retaining the second radially outer set of springs, the second spring retainer formed as a separate piece from the first spring retainer.

10. The torque transmission assembly as recited in claim 7 wherein a radially outer portion of the second cover plate includes outer tabs arranged for being driven by contact with the first radially outer set of springs.

11. The torque transmission assembly as recited in claim 6 wherein the second cover plate includes a first spring retainer at a radially outer portion thereof retaining the first radially outer set of springs, the torque transmission assembly further comprising a second spring retainer retaining the second radially outer set of springs and a drive section formed as a separate piece from the first and second spring retainers coupling the first radially outer set of springs to the second radially outer set of springs, the drive section including the first tabs.

12. The torque transmission assembly as recited in claim 11 wherein the drive section includes second tabs for drivingly contacting the first radially outer set of springs.

13. The torque transmission assembly as recited in claim 6 wherein the first tabs extend axially away from the second radially outer set of springs and toward the first radially outer set of springs.

14. The torque transmission assembly as recited in claim 1 further comprising a drive flange axially between the first and second cover plates arranged to be driven by contact with the radially inner set of springs, the drive flange including a hub configured for nonrotatably connecting to a transmission input shaft.

15. A method of constructing a torque transmission assembly comprising:
providing a first cover plate and a second cover plate supporting a radially inner set of springs therebetween;
providing a first radially outer set of springs, a second radially outer set of springs in series with the first radially outer set of springs and a drive part for transferring a torque from the second radially outer set of springs to the first radially outer set of springs, the first radially outer set of springs being axially spaced apart from the second radially outer set of springs;
providing at least one clutch plate configured for transferring the torque to the second radially outer set of springs via an axially extending ring; and
arranging the first radially outer set of springs for transferring the torque from the second radially outer set of springs to the radially inner set of springs via the second cover plate, the drive part configured for contacting the axially extending ring to limit compression of the second radially outer set of springs during operation.

16. The method as recited in claim 15 wherein the second radially outer set of springs is held by a spring retainer including a radially outer clutch plate carrier, the axially extending ring including the radially outer clutch plate carrier, the method further comprising connecting a radially outer end of the at least one clutch plate to the radially outer clutch plate carrier.

17. The method as recited in claim 15 wherein the drive part includes first tabs driven by contact with the second radially outer set of springs are arranged for transmitting torque from the second radially outer set of springs to the first radially outer set of springs.

18. The method as recited in claim 15 wherein the drive part includes a first spring retainer retaining the first radially outer set of springs, the method further comprising providing a second spring retainer retaining the second radially outer set of springs, the first and second spring retainers being separate pieces.

19. A torque transmission assembly comprising:
a first cover plate and a second cover plate supporting a radially inner set of springs therebetween;
a first radially outer set of springs and a second radially outer set of springs in series with the first radially outer set of springs, the first radially outer set of springs being axially offset from the second radially outer set of springs;
at least one clutch plate; and
a radially outer clutch plate carrier carrying a radially outer end of the at least one clutch plate, the first radially outer set of springs arranged for transferring torque from the second radially outer set of springs to the radially inner set of springs via the second cover plate,
wherein the second radially outer set of springs are radially outside of and in axial alignment with the at least one clutch plate.

20. The torque transmission assembly as recited in claim 19 wherein the first radially outer set of springs are radially aligned with the second radially outer set of springs.

* * * * *